United States Patent
Mortensen et al.

(10) Patent No.: US 10,647,573 B2
(45) Date of Patent: May 12, 2020

(54) REFORMER DEVICE COMPRISING A CO$_2$ MEMBRANE

(71) Applicant: Haldor Topsøe A/S, Kgs. Lyngby (DK)

(72) Inventors: Peter Mølgaard Mortensen, Roskilde (DK); Martin Østberg, Tune (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 67 days.

(21) Appl. No.: 15/564,521

(22) PCT Filed: Mar. 31, 2016

(86) PCT No.: PCT/EP2016/057092
§ 371 (c)(1),
(2) Date: Oct. 5, 2017

(87) PCT Pub. No.: WO2016/162263
PCT Pub. Date: Oct. 13, 2016

(65) Prior Publication Data
US 2018/0079643 A1  Mar. 22, 2018

(30) Foreign Application Priority Data
Apr. 8, 2015 (DK) .................... 2015 00214

(51) Int. Cl.
*C01B 3/38* (2006.01)
*C01B 3/48* (2006.01)

(52) U.S. Cl.
CPC .............. *C01B 3/38* (2013.01); *C01B 3/48* (2013.01); *C01B 2203/0233* (2013.01); *C01B 2203/0283* (2013.01); *C01B 2203/041* (2013.01); *C01B 2203/0475* (2013.01)

(58) Field of Classification Search
CPC ..... C01B 3/38; C01B 3/48; C01B 2203/0475; C01B 2203/041; C01B 2203/0233; C01B 2203/0283
See application file for complete search history.

(56) References Cited

U.S. PATENT DOCUMENTS

| | | | |
|---|---|---|---|
| 6,090,312 A | 7/2000 | Ziaka et al. | |
| 6,579,331 B1 | 6/2003 | Ho | |
| 7,938,893 B2 | 5/2011 | Doong et al. | |
| 8,163,065 B2 | 4/2012 | Lackner et al. | |
| 8,430,938 B1* | 4/2013 | Miller | C01B 3/382 48/197 R |
| 2003/0066239 A1* | 4/2003 | Parchamazad | B01J 8/0221 48/127.9 |
| 2005/0000161 A1 | 1/2005 | Petersson et al. | |
| 2007/0024057 A1 | 2/2007 | Sehmbi | |
| 2009/0101008 A1 | 4/2009 | Lackner et al. | |
| 2010/0044642 A1 | 2/2010 | Dijkstra et al. | |
| 2010/0129284 A1* | 5/2010 | Niitsuma | B01D 53/047 423/437.1 |
| 2010/0152900 A1* | 6/2010 | Gurciullo | C01B 3/384 700/272 |
| 2010/0260657 A1* | 10/2010 | Niitsuma | B01D 53/226 423/437.1 |
| 2011/0168572 A1 | 7/2011 | Huang | |
| 2012/0014852 A1 | 1/2012 | Huang | |
| 2012/0039794 A1 | 2/2012 | Catchpole | |
| 2012/0118011 A1* | 5/2012 | Terrien | B01D 53/002 62/619 |
| 2012/0121497 A1* | 5/2012 | Terrien | B01D 53/002 423/437.1 |
| 2012/0291483 A1* | 11/2012 | Terrien | C01B 3/36 62/619 |
| 2012/0292574 A1* | 11/2012 | Terrien | B01D 53/002 252/373 |
| 2013/0072583 A1* | 3/2013 | Koskinen | C01B 3/38 518/703 |
| 2013/0287678 A1 | 10/2013 | Okada et al. | |
| 2014/0170061 A1* | 6/2014 | Chaubey | B01D 53/226 423/658.3 |
| 2014/0264176 A1 | 9/2014 | Wynn et al. | |
| 2014/0357737 A1* | 12/2014 | Abbott | C10K 1/005 518/704 |
| 2015/0047989 A1 | 2/2015 | Huang | |
| 2015/0090125 A1 | 4/2015 | Lin et al. | |
| 2015/0323248 A1* | 11/2015 | Terrien | C01B 3/36 252/373 |

FOREIGN PATENT DOCUMENTS

| | | |
|---|---|---|
| CN | 1639057 A | 7/2005 |
| JP | 2001-511430 A | 8/2001 |

(Continued)

OTHER PUBLICATIONS

International Search Report (PCT/ISA/210) dated Jul. 8, 2016, by the European Patent Office as the International Searching Authority for International Application No. PCT/EP2016/057092.

(Continued)

*Primary Examiner* — Anthony J Zimmer
(74) *Attorney, Agent, or Firm* — Buchanan Ingersoll & Rooney P.C.

(57) ABSTRACT

A reformer device including a reaction chamber for carrying out a reaction having a hydrocarbon stream as a reactant gas and with hydrogen rich synthesis gas as a reaction product. The membrane is provided within the reaction chamber. The reformer device further includes a heating reactor for heating the reaction chamber, where the membrane is a semi-permeable membrane arranged to allow CO$_2$ pass through it; the reaction chamber includes a catalyst material arranged to catalyze a steam methane reforming reaction and to catalyze a water gas shift reaction; and the reformer device is arranged to carry out the steam methane reforming reaction at a pressure between about 15 and about 50 barg within the reaction chamber. A method for carrying out a reaction having a hydrocarbon stream as a reactant gas and with hydrogen rich synthesis gas as reaction product, in a reformer device.

12 Claims, 8 Drawing Sheets

(56) References Cited

FOREIGN PATENT DOCUMENTS

Figure 1:
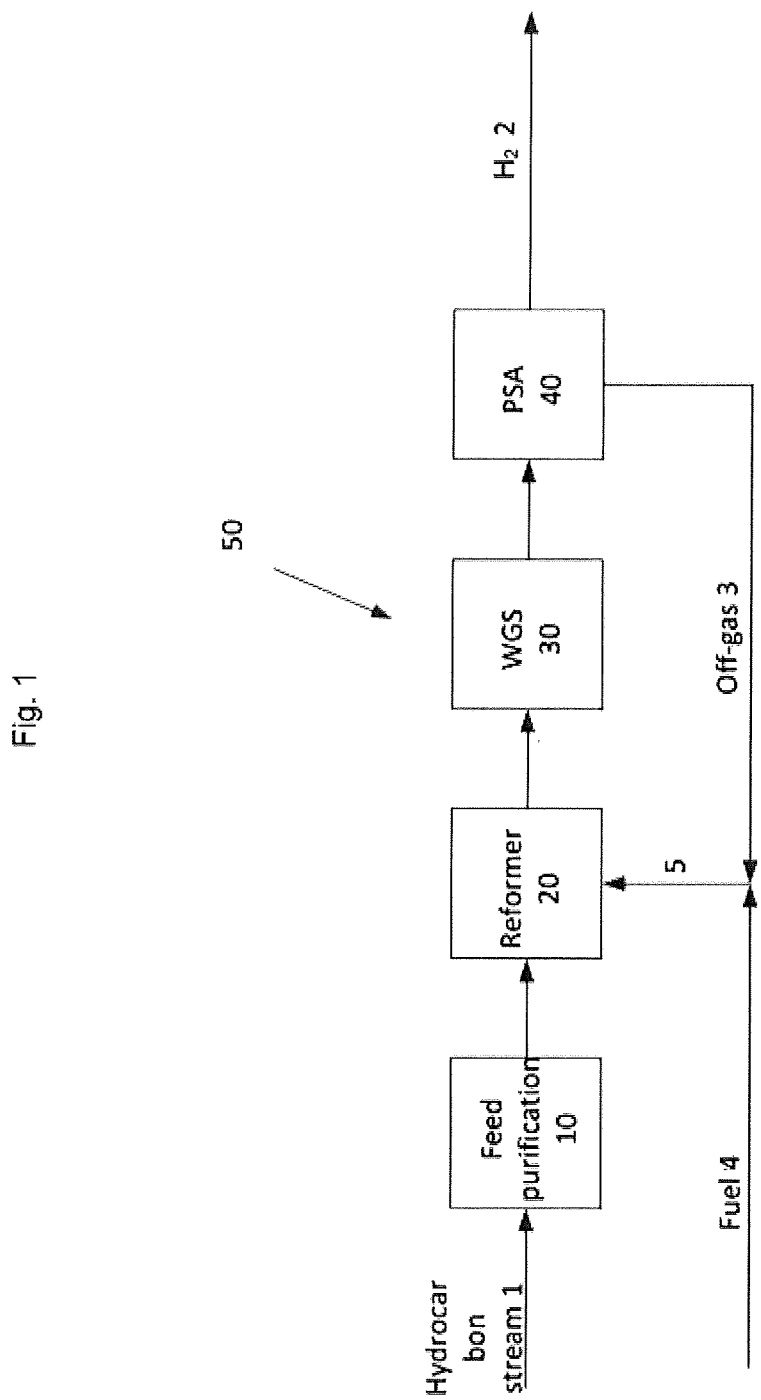

| | | |
|---|---|---|
| JP | 2004-244275 A | 9/2004 |
| JP | 2005-519012 A | 6/2005 |
| JP | 2009-179555 A | 8/2009 |
| WO | 9906138 A1 | 2/1999 |
| WO | WO 99/06138 A1 | 2/1999 |
| WO | 03/072493 A1 | 9/2003 |
| WO | WO 2004/069739 A1 | 8/2004 |
| WO | WO 2007/142518 A1 | 12/2007 |
| WO | 2012-086836 A1 | 6/2012 |

OTHER PUBLICATIONS

Written Opinion (PCT/ISA/237) dated Jul. 8, 2016, by the European Patent Office as the International Searching Authority for International Application No. PCT/EP2016/057092.

Danish Search Report dated Oct. 21, 2015, issued by the Danish Patent Office in the corresponding Danish Patent Application No. PA 2015 00214. (7 pages).

Zou, J. et al., "C02-Selective Water Gas Shift Membrane Reactor for Fuel Cell Hydrogen Processing", Industrial & Engineering Chemistry Research, American Chemical Society, vol. 46, No. 8, pp. 2272-2279, Apr. 11, 2007, XP-002571135.

Lima, A.A.G. et al., "Composition effects on the activity of Cu—ZnO—Al2O3 based catalysts for the water gas shift reaction: A statistical approach", Applied Catalysis A: General, vol. 171, No. 1, pp. 31-43, Jun. 29, 1998, XP004271466.

Office Action (Notice of Reasons for Refusal) dated Oct. 23, 2019, by the Japanese Patent Office in corresponding Japanese Patent Application No. 2017-552985, and an English Translation of the Office Action. (10 pages).

Wu, Exhibition 1: Flow chart for hydrogen production by methane steam reforming, in Hydrogen Energy and Hydrogen Producing Technologies, Zhejiang University Press, Sep. 30, 2014, pp. 65-66, (7 pages).

Office Action (First Office Action) dated Jun. 26, 2019, by the China National Intellectual Property Administration (CNIPA) in corresponding Chinese Patent Application No. 201680020638.9 and an English Translation of the Office Action. (18 pages).

\* cited by examiner

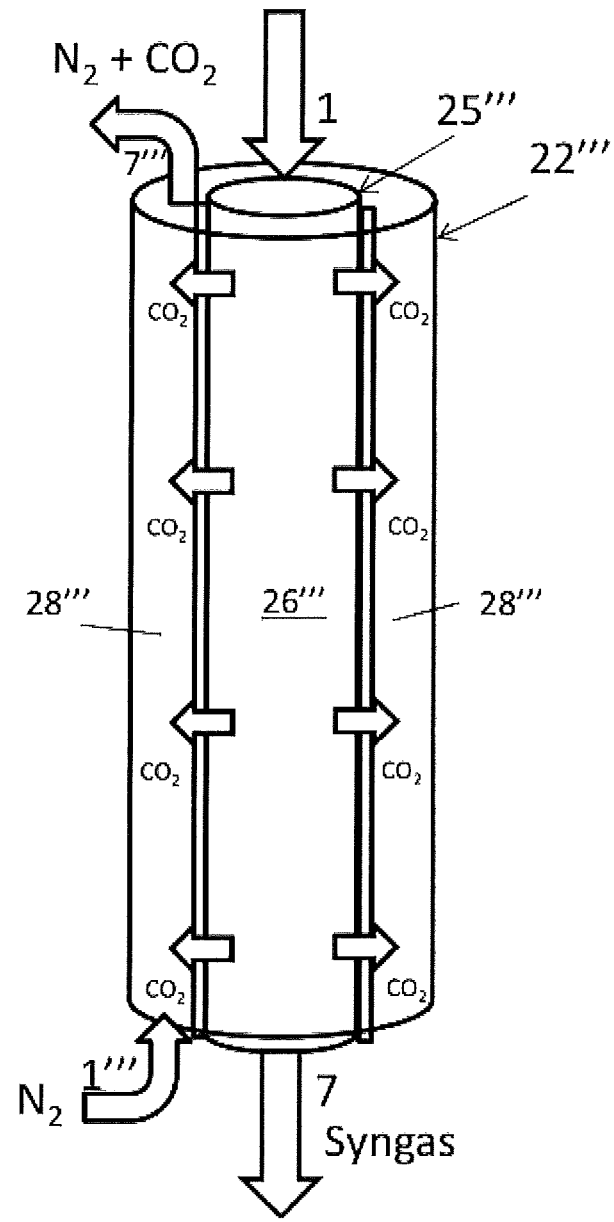

REFORMER DEVICE COMPRISING A $CO_2$ MEMBRANE

The invention relates to a reformer device comprising a reaction chamber for carrying out a reaction having a hydrocarbon stream as a reactant gas and with hydrogen rich synthesis gas as a reaction product, wherein a membrane is provided within the reaction chamber, said reformer device further comprising a heating reactor for heating the reaction chamber. The invention moreover relates to a method for carrying out a reaction having a hydrocarbon stream as a reactant gas and with hydrogen rich synthesis gas as reaction product, in a reformer device, where the reformer device comprises a reaction chamber, said reaction chamber comprising a semi-permeable membrane, and a heating reactor.

Current global demand for hydrogen is increasing, particularly in refineries where hydrogen is utilized in order to reduce sulfur content and in upgrading the bottom of the barrel. Within a given refinery, the hydrogen plant will feature as one of the largest fired furnaces with respect to energy input. Therefore, it is important to maximize the efficiency of hydrogen production in order to reduce the energy consumption and $CO_2$ footprint of the hydrogen plant.

Within a reformer device comprising a reaction chamber for carrying out reactions having a hydrocarbon stream as a reactant gas and having hydrogen rich synthesis gas as a reaction product, typical reactions comprise:

$$CH_4 + H_2O = CO + 3H_2 \quad (1)$$

$$CO + H_2O = CO_2 + H_2 \quad (2)$$

$$C_nH_m + nH_2O = nCO + (n + \tfrac{1}{2}m)H_2 \quad (3)$$

The reaction (3) only takes place in the case where the feed gas comprises higher hydrocarbons.

The combination of the reforming reaction (1) and the water gas shift reaction (2) is:

$$CH_4 + 2H_2O = CO_2 + 4H_2 \quad (4)$$

WO2007/142518 relates to a reactor device and a method for carrying out a reaction with hydrogen as reaction product. The reactor device comprises a reaction chamber for carrying out a reaction with hydrogen ($H_2$) as reaction product. The reactor device comprises a combustion chamber and a hydrogen-permeable membrane, which is provided between the reaction chamber and the combustion chamber. A supply channel is provided in the combustion chamber, for supplying a fluid containing oxygen ($O_2$), such as air, to the combustion chamber.

U.S. Pat. No. 8,163,065 relates to a carbon dioxide permeable membrane. The membrane includes a body having a first side and an opposite second side, and the body is configured to allow carbon dioxide to pass from the first side to the second side. U.S. Pat. No. 8,163,065 describes, column 10, lines 43-51, that the carbon dioxide membrane could be used for steam methane reforming. However, in this application, the system can be limited to low-pressure operation, and that gasification of a more carbon rich fuel, such as biomass, oil, coal or charcoal, with oxygen or steam can contain a larger concentration of carbon dioxide product gas that would favor the use of a high temperature and pressure membrane.

An object of the invention is to provide a reformer device and a method for increasing the yield of hydrogen from a hydrocarbon reactant gas. Another object of the invention is to reduce the operating costs of a reformer device and a method for producing hydrogen. Another object of the invention is to reduce the capital expenditures for a hydrogen producing plant.

One aspect of the invention relates to a reformer device comprising a reaction chamber for carrying out a reaction having a hydrocarbon stream as a reactant gas and with hydrogen rich synthesis gas as a reaction product. A membrane is provided within the reaction chamber, and the reformer device further comprises a heating reactor for heating the reaction chamber. The membrane is a semi-permeable membrane arranged to allow $CO_2$ pass through it. The reaction chamber comprises a catalyst material arranged to catalyze a steam methane reforming reaction and to catalyze a water gas shift reaction. The reformer device is arranged to carry out the steam methane reforming reaction at a pressure between about 15 and about 50 barg within the reaction chamber. The semi-permeable membrane is arranged to allow carbon dioxide to pass through it and to hinder the other components of the reactions, viz. hydrogen, CO, from permeating through it.

The skilled person would know how to choose an appropriate catalyst material arranged to catalyze a steam methane reforming reaction and to catalyze a water gas shift reaction. As examples only, such a catalyst material could be a nickel based steam reforming catalyst with a ceramic carrier made of oxides, such as for example aluminum oxide, magnesium oxide or calcium oxide. The catalyst may also include ruthenium and/or rhenium as active phase.

The membrane material may be any appropriate membrane material, advantageously a dual-phase ceramic carbonate membrane. Examples could be ceramic phases as SDC ($Ce_{0.8}Sm_{0.2}O_{1.9}$), LSCF ($La_{0.6}Sr_{0.4}Co_{0.8}Fe_{0.2}O_{3-\delta}$), or LCGFA ($La_{0.85}Ce_{0.1}Ga_{0.3}Fe_{0.6}Al_{0.05}O_{3-\delta}$) or a carbonate phase of a mixture of Li/Na/K carbonate. The dual-phase ceramic-carbonate membrane is a non-porous type membrane where $CO_2$ is transported through the membrane. $CO_2$ reacts with oxygen ions in the membrane and can then diffuse in the carbonate phase to the CO2-deficient side. Oxygen ions are then transported back to the $CO_2$-rich side in the ceramic oxide. These membranes have absolute selectivity for $CO_2$ if they can be ensured leak tight and can additionally be used at high temperature operation (up to 1000° C.).

Typical reformers are operated at a medium pressure, such as at between 15 and 50 barg, in order to avoid reformers from being inadvertently big. When the resultant hydrogen rich gas is output at medium pressure, the use of a separate compressor for pressurizing the hydrogen rich synthesis gas is superfluous. However, this pressure within the reformer is disadvantageous from a reaction point of view. It is well known to use a hydrogen permeable membrane in a reformer. However, in this case the $CO_2$ rich gas is typically delivered at the medium pressure, e.g. 30 barg, whilst the hydrogen $H_2$ will be at low pressure, e.g. 1 bar.

When using a semi-permeable membrane within the reaction chamber, the membrane being arranged to allow $CO_2$ to pass, according to the invention, the hydrogen rich synthesis gas may be output at a medium pressure, corresponding to the pressure within the reaction chamber, whilst the $CO_2$ is provided at about 1 bar. Thus the hydrogen rich synthesis gas may be output at a medium pressure without the use of a compressor.

When the catalyst material is arranged to both catalyze a steam methane reforming reaction and a water gas shift reaction, both steam methane reforming and water gas shift can take place within the reaction chamber. The combination of the steam methane reforming reaction and the water gas shift reaction is: (4) $CH_4 + 2\ H_2O = CO_2 + 4\ H_2$. When carbon monoxide (CO) and carbon dioxide ($CO_2$) is removed already in the reformer device and when the catalyst material is arranged to both catalyze a steam methane reforming reaction and a water gas shift reaction, a separate water gas shift unit and/or pressure swing adsorption unit may be spared or at least reduced in size. Moreover, a product with high purity hydrogen is obtained with little or no content of carbon monoxide and/or carbon dioxide.

When $CO_2$ passes through the $CO_2$ membrane and is outlet from the reformer device, the reaction (4) is shifted towards the product (right side of reaction) and therefore, the temperature within the reformer device may be lowered compared to a situation where the $CO_2$ stays within the reaction chamber while maintaining a similar yield of hydrogen. All CO may also be removed and $CH_4$ slip may be minimized due to the shifting of the reaction (4) towards the product. In addition to being able to reduce the reaction temperature, it is another advantage that a separate unit for water gas shift in a plant for producing hydrogen may be reduced considerably in size or even spared.

In total, the hydrogen yield per consumed hydrocarbon reactant gas is also increased in a reaction device with a $CO_2$ membrane in the reaction chamber compared to a reaction device operated at the same conditions but without the membrane. Moreover, $CO_2$ is delivered as or can relatively easy be converted into a relative pure, possibly valuable, product. Methane reforming is a strongly endothermic reaction requiring high energy input and typically it results a high $CO_2$ footprint. The $CO_2$ footprint is in particular large in hydrogen plants where the C-atoms in the hydrocarbon feed stream is neither collected in a $CO_2$ product (which is traditionally done in $NH_3$ plants) nor a part of a downstream C-containing product, but is vented in a stack. Removing $CO_2$ with a membrane in the reformer device will facilitate a major reduction in required heat input due to lower required reforming temperature and an inherent reduction in $CO_2$ emission. Additionally, collecting the C-atoms in the hydrocarbon feed streams in a $CO_2$ footprint rich product leads to substantial additional reduction in $CO_2$ footprint from hydrogen plants.

It is clear, that the invention is not limited to a reformer device with only one reaction chamber; instead, any appropriate number of reaction chambers may be present within the reformer device.

In an embodiment, the membrane defines an inner diffusion chamber, the inner diffusion chamber having an inlet to admit a sweep gas arranged to sweep $CO_2$ diffused into the diffusion chamber out through an outlet from the diffusion chamber. As an example only, the sweep gas may be $N_2$ or $H_2O$. As an example only, the membrane may be placed internally as an inner tube within the reaction chamber so that during operation of the reformer device of the invention, $CO_2$ will diffuse from outside the inner tube into the inner tube.

In another embodiment, the membrane defines an inner reaction chamber and an outer diffusion chamber, the outer diffusion chamber having an inlet to admit a sweep gas arranged to sweep $CO_2$ diffused into the outer diffusion chamber through the diffusion chamber and out through an outlet from the outer diffusion chamber. The membrane may be placed internally as an inner tube, which then hosts the catalyst material, and the outer diffusion chamber is defined by the space between the inner tube formed by the membrane and the reaction chamber. The diameter of the inner tube formed by the membrane has influence on the production of hydrogen rich synthesis gas. Increasing the membrane diameter or the inner tube diameter will cause an increase in the production of hydrogen rich synthesis gas.

In an embodiment, the reformer device is arranged to allow the sweep gas and the reactant gas to flow in countercurrent. Calculations have shown that when the sweep gas flows in countercurrent to the reactant gas flow, the production in hydrogen rich synthesis gas is increased (see FIG. 5) compared to the case where the sweep gas flows concurrently with the reactant gas flow. This is due to the saturation of the sweep gas with $CO_2$ when the sweep gas flows concurrently with the reactant gas flow. Such a saturation is avoided in countercurrent flow.

In an embodiment, the permeance of the $CO_2$ membrane is above about 1 $kmol/m^2/h/atm$, preferably above about 3 $kmol/m^2/h/atm$, more preferably above about 8 $kmol/m^2/h/atm$. The permeance of the $CO_2$ membrane has a significant effect on the production of hydrogen rich synthesis gas, at least up to about 2 $kmol/m^2/h/atm$.

In an embodiment, the membrane is only provided in the most downstream part of the reaction chamber, such as the most downstream half of the reaction chamber, the most downstream third or most downstream fourth of the reaction chamber. Simulations have revealed that intensive removal of $CO_2$ from the upstream part of the reaction chamber leads to decreasing production of hydrogen rich synthesis gas, especially in the case of a sweep gas in co-current with the reactant gas. This is because $CO_2$ removal in this part shifts the water gas swift reaction toward the "$CO_2+H_2$" side (see reaction (4)), resulting in removal of water and therefore a decreasing potential for methane conversion in the steam reforming reaction (see reaction (1)). It has turned out to be advantageous to make a design where a $CO_2$ membrane is only provided in the most downstream half, such as the most downstream one third or most downstream one fourth of the reaction chamber. Calculations show that such a design has the same efficiency as a similar reaction chamber with a membrane throughout the whole length of the reaction chamber for high permeance values.

In an embodiment, the temperature within the reformer device during steam reforming is below about 800° C., preferably at about 700° C. When the operating temperature of the reformer device during steam reforming is decreased from e.g. 950° C. to below about 800° C., e.g. at about 700° C., several benefits are achievable:

- The heat to be provided by the heating reactor is decreased. In case the heating reactor is a fired reactor, the firing intensity is decreased.
- The size of a waste heat section for cooling down an effluent from the heating reactor is decreased due to the decreased requirements for heat provided by the heating reactor.
- The demands on the material of the reaction chamber are decreased, which allows for thinner walls of the reaction chamber and/or and less expensive types of material, compared to current reaction chambers.

In an embodiment, the reformer device is a fired reformer, a radiant wall reformer, a convective reformer, e.g. a heat exchange reformer or a tubular bayonet reformer, or an autothermal reformer. In case of an autothermal reformer, the heating reactor and the reaction chamber are integrated into one chamber.

Another aspect of the invention relates to a method for carrying out a reaction having a hydrocarbon stream as a reactant gas and with hydrogen rich synthesis gas as reaction product, in a reformer device, where the reformer device comprises a reaction chamber, said reaction chamber comprising a semi-permeable membrane, and a heating reactor for heating the reaction chamber. The hydrocarbon stream is admitted into the reformer device and brought into contact with a catalyst material arranged to catalyze a steam methane reforming reaction and arranged to catalyze a water gas shift reaction within the reaction chamber. During the reaction, $CO_2$ passes through the semi-permeable membrane. The pressure within the reaction chamber is between about 15 and about 50 barg. As an example only, the pressure within the reaction chamber is 35 barg.

In an embodiment, $CO_2$ is removed from the reaction chamber continuously. In an embodiment, the catalyst material also catalyzes a water gas shift reaction within the reaction chamber.

In an embodiment, the membrane defines an inner diffusion chamber, and wherein a sweep gas is admitted into the inner diffusion chamber through an inlet, where the sweep gas sweeps $CO_2$ diffused into the diffusion chamber out through an outlet from the diffusion chamber. As an example only, the membrane may be placed internally as an inner tube within the reaction chamber so that during operation of the reformer device of the invention, $CO_2$ will diffuse from outside the inner tube into the inner tube.

In an embodiment, the sweep gas and the reactant gas to flow in countercurrent. Calculations have shown that when the sweep gas flows in countercurrent to the reactant gas flow, the production in hydrogen rich synthesis gas is increased (see FIG. 5) compared to the case where the sweep gas flows concurrently with the reactant gas flow. This is due to the saturation of the sweep gas with $CO_2$ when the sweep gas flows concurrently with the reactant gas flow. Such a saturation is avoided in countercurrent flow.

In an embodiment, the temperature within the reformer device during steam reforming is below about 800° C., preferably at about 700° C. When the operating temperature of the reformer device during steam reforming is decreased from e.g. 950° C. to below about 800° C., e.g. at about 700° C., several benefits are achievable:

The heat to be provided by the heating reactor is decreased. In case the heating reactor is a fired reactor, the firing intensity is decreased.

The size of a waste heat section for cooling down an effluent from the heating reactor is decreased due to the decreased requirements for heat provided by the heating reactor.

The demands on the material of the reaction chamber are decreased, which allows for thinner walls of the reaction chamber and/or and less expensive types of material, compared to current reaction chambers.

The term "medium pressure" is meant to denote a pressure between the normal meaning of the terms "low pressure" and "high pressure", where the term "low pressure" typically means a pressure of 0-5 barg and the term "high pressure" typically means a pressure of about 100 barg or above. Thus, "medium pressure" will be between 5 barg and 100 barg.

The term "barg" denotes a pressure gauge zero-referenced to atmospheric pressure and thus denotes a pressure above atmospheric pressure.

SHORT DESCRIPTION OF DRAWINGS

Figure 2:
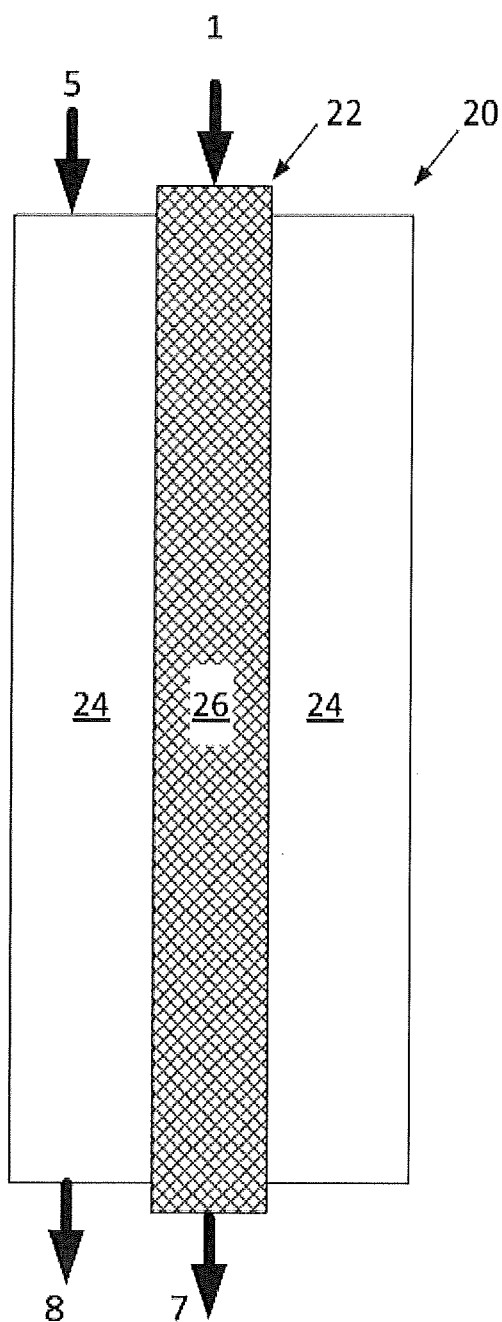
Figure 3A:
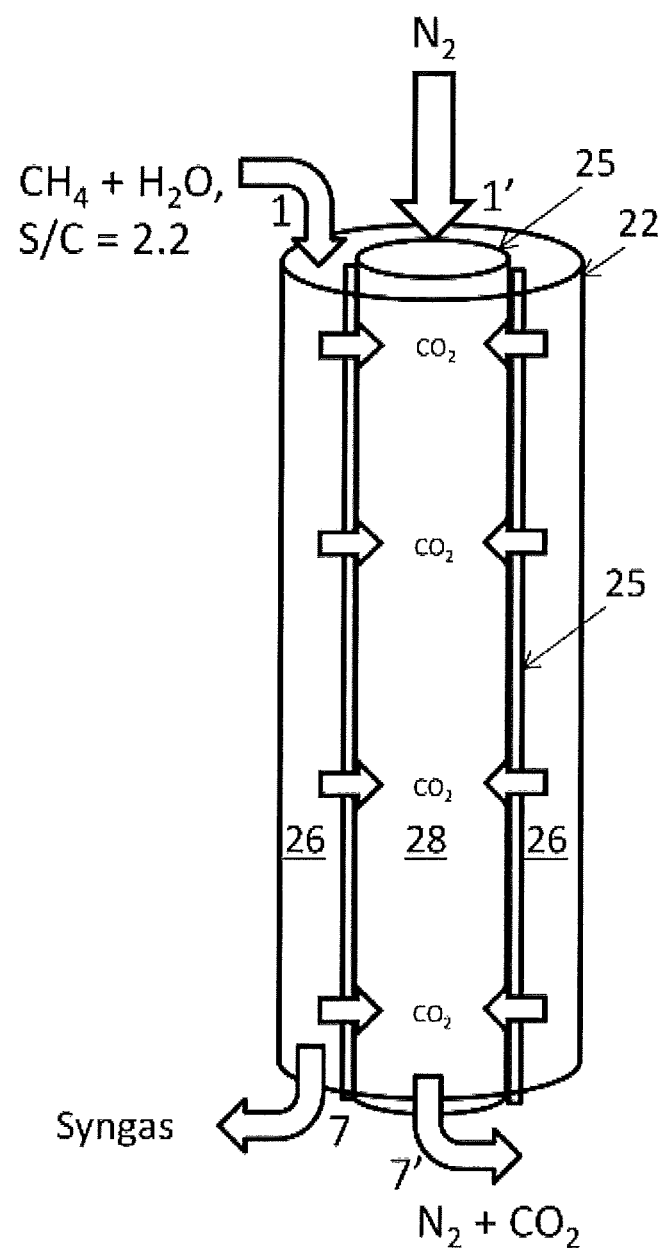
Figure 3B:
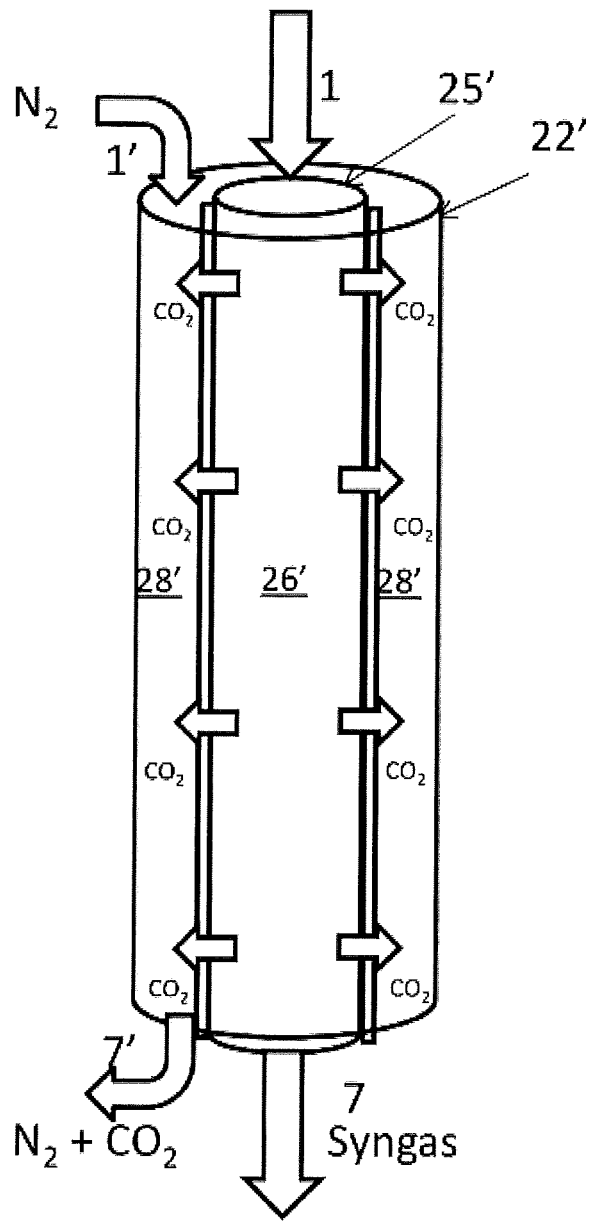
Figure 3C:
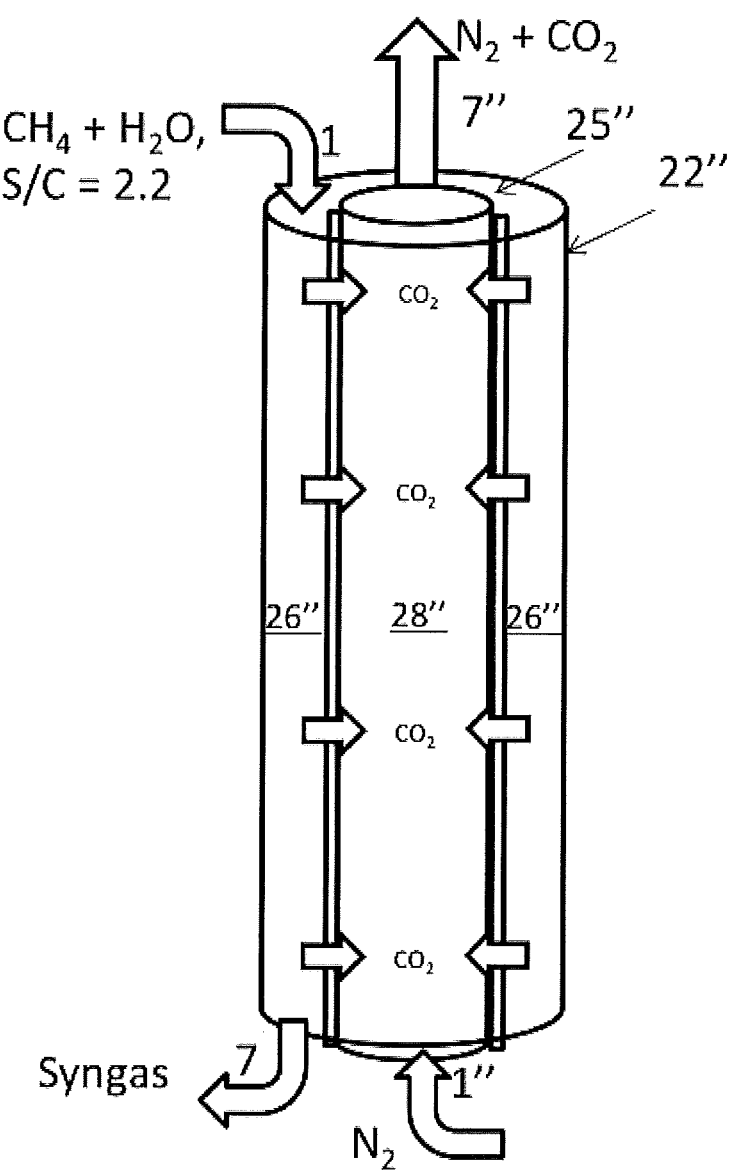
Figure 4:
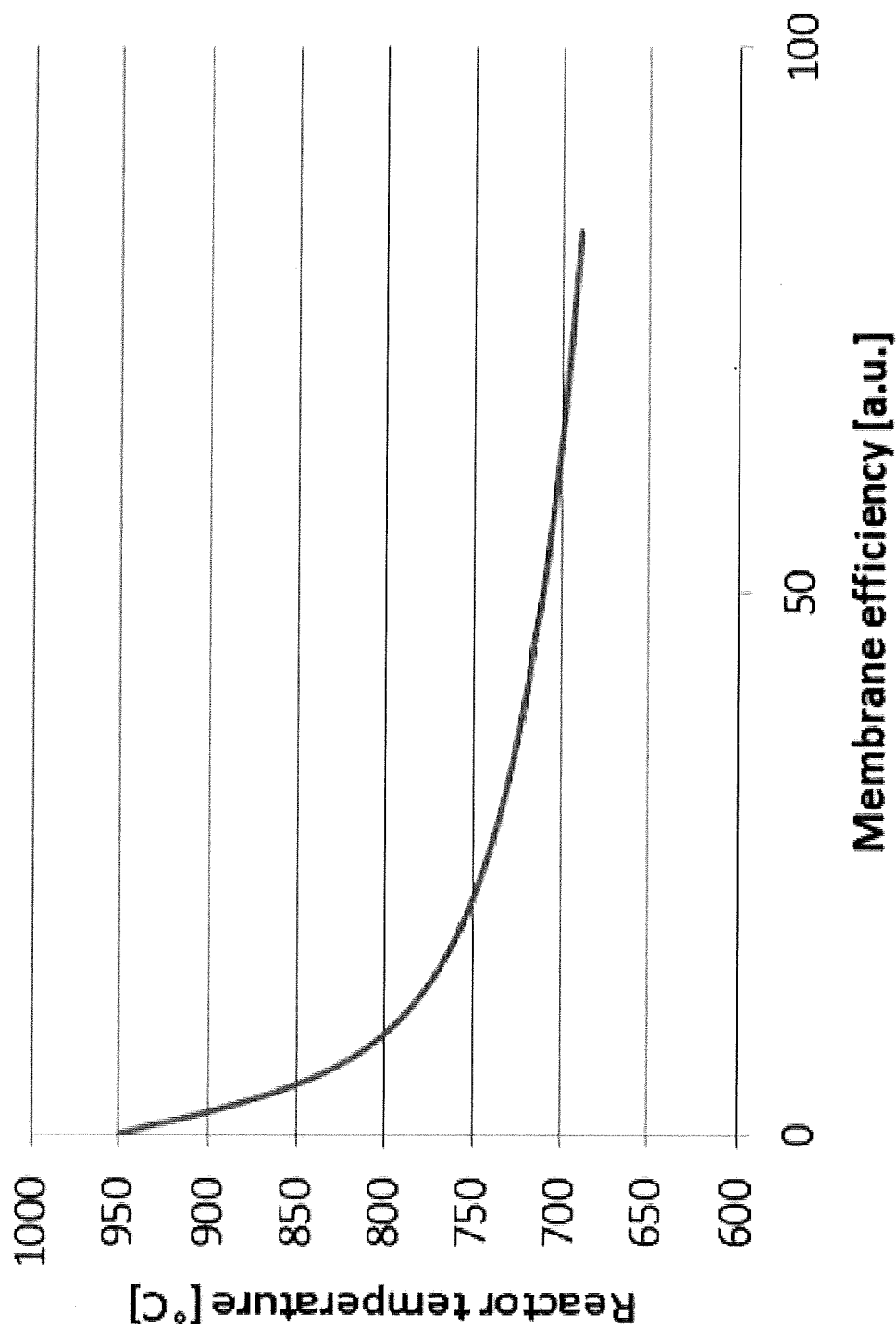
Figure 5:
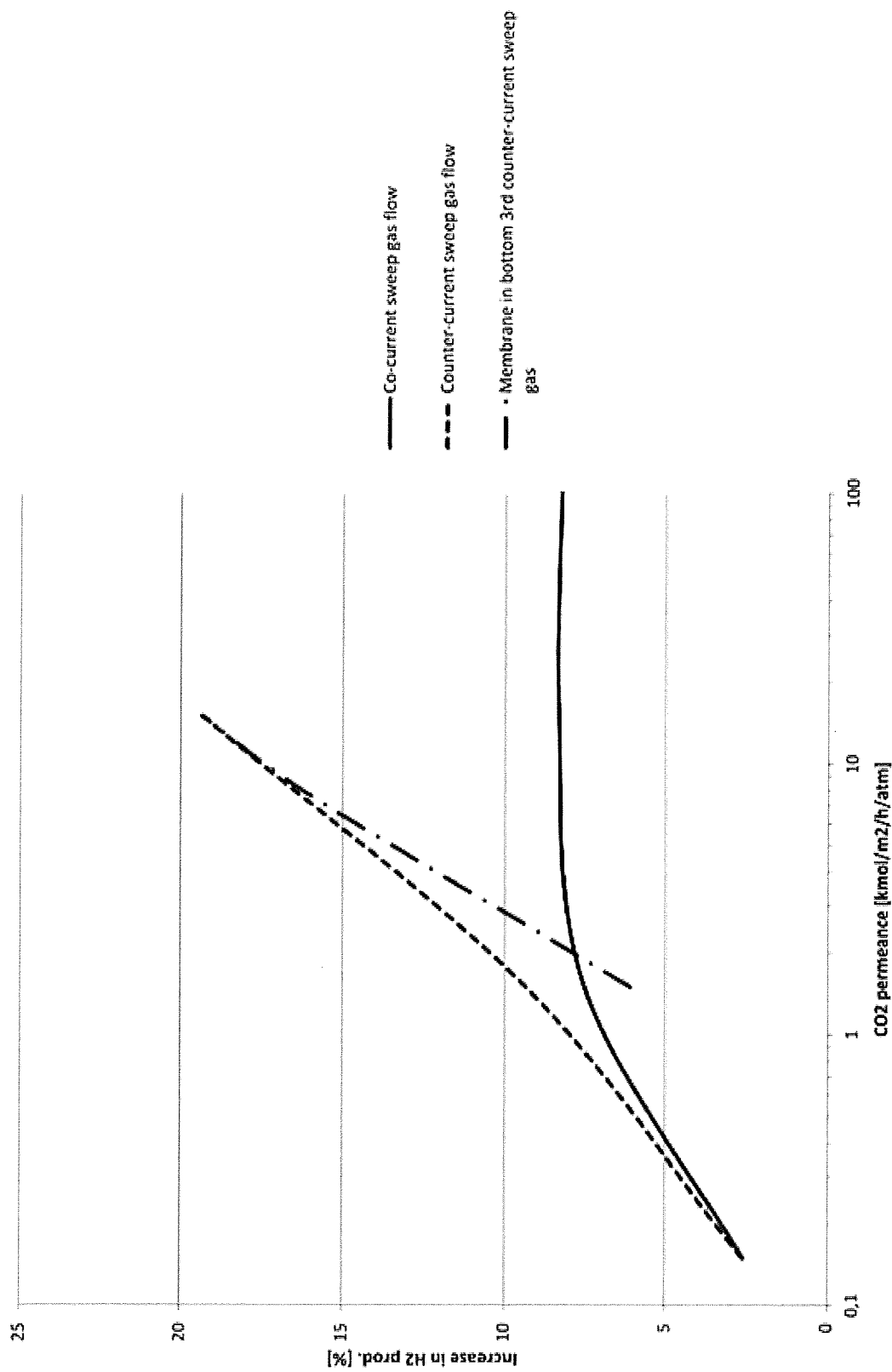

FIG. 1 is a schematic drawing of an example of a hydrogen plant,
FIG. 2 is a schematic drawing of an example of a reformer device 20,
FIGS. 3a-3d are schematic drawings of exemplary reaction chambers of a reformer device according to the invention,
FIG. 4 is a graph depicting the reactor temperature within an embodiment of a reaction chamber of the invention as a function of the efficiency of a membrane in a reaction chamber of the invention, and
FIG. 5 is a graph depicting an increase in $H_2$ production as a function of the $CO_2$ permeance of the membrane in an embodiment of a reaction chamber of the invention.

DETAILED DESCRIPTION OF DRAWINGS

The figures show exemplary embodiments of the invention only and are not to be seen as limiting the invention. Throughout the figures, like reference numbers are meant to indicate like features. Moreover, it should be noted that the orientation of the reformer device of the invention is not limited to the orientation shown in the FIGS. 2 and 3a-3d. Thus, instead of a vertical orientation of the reformer device, it could be horizontal. Moreover, the feedstock steam could be input into the reformer device at the lower side thereof instead of at the upper side thereof, if appropriate.

FIG. 1 is a schematic drawing of a hydrogen plant 50, comprising a feed purification unit 10, a reformer 20, a water gas shift unit 30 and a pressure swing adsorption unit 40.

Feedstock stream 1 is input to the feed purification unit 10. The feed purification unit 10 is arranged to remove sulfur and/or chlorine compounds and/or to saturate olefins, including di-olefins in hydrocarbon feedstock streams. The feedstock stream is a hydrocarbon stream, such as for example natural gas/methane $CH_4$. The reaction product 2 is hydrogen ($H_2$).

A prereforming unit may be present (not shown in FIG. 1) for steam reforming of all higher hydrocarbons in the feedstock in order to provide more stable and mild operating conditions for the reformer device in carrying out the steam methane reforming. With a prereformer, the risk of carbon formation from higher hydrocarbons in the reaction chamber of the reformer device is reduced and the operating parameters, such as maximum average flux and temperature, can be optimized. Moreover, heat integration and heat recovery can be improved as the prereformed hydrocarbon/steam mixture can be preheated to a high temperature (typically 625-650° C.) without the risk of coking in the preheat coil.

Steam reforming takes place in the reformer 20. During operation, the reactant stream or supply stream is fed to the reaction chamber of the steam reformer.

The reformer 20 is a reformer device having one or more reaction chambers, e.g. reformer tubes, for carrying out a steam methane reforming reaction. Since the steam methane reforming reaction is endothermic, heat needs to be supplied, and therefore the one or more reaction chambers are placed within a heating reactor for heating the one or more reaction chambers. In order to provide the heat, fuel 4 is input into the heating reactor. An oxidant stream, such as oxygen or atmospheric air, may be input into the heating reactor together with the fuel 4 or via a separate input into the heating reactor.

The reformer may e.g. be a fired reformer, such as a top fired reformer or a bottom fired reformer, a radiant wall reformer, a convective reformer, a heat exchange reformer or a bayonet reformer.

An off-gas stream 3 from the PSA 40 may also be input to the reformer 20. The off-gas stream 3 typically comprises $CO_2$, $H_2$ and $CH_4$, and is recycled to the heating reactor of the reformer 20 in order to use its fuel value. In FIG. 1, the streams 3 and 4 are mixed into one stream 5. However, it is also conceivable that the streams 3 and 4 were input into separate inputs to the heating reactor.

The catalyst material within the reformer device is arranged to carry out water gas shift in addition to steam methane reforming. A separate water gas shift unit may be done without or at least reduced in size, if the water gas shift reaction carried out by the catalyst material within the reformer device is sufficient. However, alternatively, a separate water gas shift unit 30 may be present within the plant 50. The water gas shift unit 30 may be smaller than conventional water gas shift units if the catalyst within the reformer 20 is arranged to carry out water gas shift as well.

In the case where the feedstock stream 1 is methane $CH_4$, and where only a partial water gas shift reaction takes place within the reformer 20, the stream from the reformer 20 comprises CO, $CO_2$ and $H_2$. In case of a full water gas shift reaction, that is a conversion of most of the CO in the gas within the reaction chamber, the stream output from the reformer mainly comprises carbon dioxide $CO_2$ and hydrogen $H_2$ The stream from the water gas shift unit 30 (or the stream from the combined reformer and water gas shift unit 20, in case of a hydrogen plant 50 without a separate water gas shift unit) mainly comprises carbon dioxide $CO_2$ and hydrogen $H_2$.

The stream from the water gas shift unit 30 (or the stream from the combined reformer and water gas shift unit 20, in case of a hydrogen plant 50 without a separate water gas shift unit) is input into a pressure swing adsorption (PSA) unit 40 arranged to separate carbon dioxide from hydrogen 2. The carbon dioxide is removed from the PSA unit 40, and some of it is recycled as stream 3 to the heating reactor of the reformer 2 for temperature control.

Even though FIG. 1 shows a hydrogen plant, it is stressed that the invention is not limited to hydrogen plants. For example, the invention is also advantageous in ammonia plants, since ammonia plants typically comprise expensive $CO_2$ removal units, which can be done without or at least reduced considerably in size in a plant with a reformer device of the invention.

FIG. 2 is a schematic drawing of an example of a reformer device 20. The reformer device 20 is a steam methane reformer and comprises a reaction chamber 22 and a surrounding heating reactor 24. The reaction chamber 22 comprises catalyst material 26. The reaction chamber 22 is shown as a single unit in FIG. 2; however, the reaction chamber 22 could be a plurality of reaction tubes instead of a single unit. A hydrocarbon stream 1 as a reactant gas is input into the reaction chamber 22, and a hydrogen rich synthesis gas is output as a reaction product 7. The hydrogen rich synthesis gas 7 typically comprises $H_2$ and $CO_2$. The hydrogen rich synthesis gas 7 may also comprise carbon monoxide CO if only a partial or no water gas shift reaction takes place within the reaction chamber 22. The hydrogen rich synthesis gas may also comprise further constituents. The reaction chamber 22 is surrounded by a heating reactor 24, at least along majority of its length. The heating reactor 24 of FIG. 2*a* comprises burners (not shown in FIG. 2*a*) for heating the reaction chamber, either directly or by heating the outer walls of the heating reactor 24. The burners use fuel 5 (see FIG. 1) input into the reaction chamber, and effluent gas from the combustion is output as output stream 8. Alternatively, a heating reactor 24 may heat the reaction chamber 22 by convection or heat exchange with hot gas. The membrane within the reformer device 20 is not shown in FIG. 2; the membrane is shown in FIGS. 3*a*-3*d*.

FIGS. 3*a*-3*d* are schematic drawings of exemplary reaction chambers of a reformer device according to the invention. It should be noted that the relative dimensions of the reaction chambers are not to scale in FIGS. 3*a*-3*d*. Instead the dimensions of FIGS. 3*a*-3*d* are changed in order to show the features thereof most clearly.

FIG. 3*a* is a schematic drawing of an exemplary reaction chamber 22 of a reformer device according 20 to the invention. The reaction chamber of the reformer device of the invention may be one out of a plurality of reaction chambers, e.g. one out of a plurality of steam reformer tubes. The embodiment shown in FIG. 3*a* is an inner diffusion chamber with a co-current flow of sweep gas.

The reaction chamber 22 comprises a membrane 25 extending along all of a longitudinal axis (not shown in FIG. 3*a*) of the reaction chamber 22. As showed in FIG. 3*a*, the membrane 25 is placed as an inner tube within the reaction chamber so that during operation of the reformer device of the invention, $CO_2$ will diffuse from outside the inner tube into the inner tube as indicated by the horizontal arrows in FIG. 3*a*. The membrane 25 thus defines an inner diffusion chamber 28. The reaction chamber 22 surrounding the inner diffusion chamber 28 comprises catalyst material 26 arranged to catalyze both a steam methane reforming reaction and a water gas shift reaction. The catalyst material 26 is thus confined to the space between the membrane 25 and the inner wall of the reaction 22. In a cross-section perpendicular to the longitudinal axis of the reaction chamber 22, this space is an annular space.

The inner diffusion chamber 28 has an inlet 1' to admit a sweep gas arranged to sweep $CO_2$ diffused into the diffusion chamber through the diffusion chamber 28 and out through an outlet 7' from the diffusion chamber 28. As an example only, the sweep gas may be $N_2$ or $H_2O$. However, the sweep gas could be any appropriate gas. The diameter of the inner tube formed by the membrane 25 influences the production of hydrogen rich synthesis gas. Increasing the membrane diameter or the inner tube diameter will cause an increase in the production of hydrogen rich synthesis gas (syngas). The reaction chamber 22 moreover comprises an inlet 1 for supply stream of hydrocarbon stream, e.g. natural gas $CH_4$ and $H_2O$, and an outlet 7 for outletting hydrogen rich synthesis gas (syngas).

FIG. 3*b* is a schematic drawing of an exemplary reaction chamber 22' of a reformer device 20 according to the invention. The reaction chamber 22' of the reformer device of the invention may be one out of a plurality of reaction chambers, e.g. one out of a plurality of steam reformer tubes. The embodiment shown in FIG. 3*b* is an outer diffusion chamber with a co-current flow of sweep gas.

The reaction chamber 22' comprises a membrane 25' extending along all of a longitudinal axis (not shown in FIG. 3*b*) of the reaction chamber 22'.

As showed in FIG. 3*b*, the membrane 25' is placed as an inner tube within the reaction chamber. The inner tube of the reaction chamber 22' as confined by the membrane 25' comprises catalyst material 26' arranged to catalyze both a steam methane reforming reaction and a water gas shift reaction. Thus, in contrast to the embodiment shown in FIG. 3*a*, the inner tube of the reaction chamber 22' as confined by the membrane 25' is the reaction zone of the reaction chamber 22', whilst the space as defined between the membrane 25' and the inner wall of the reaction chamber 22' along the longitudinal axis of the reaction chamber 22' constitutes the diffusion chamber 28'.

The inlet 1 for inletting a hydrocarbon stream, e.g. natural gas $CH_4$ and $H_2O$, is an inlet into the inner tube created by the membrane 25', and an outlet 7 for outletting hydrogen rich synthesis gas (syngas) is also from the inner tube, since in the embodiment of FIG. 3b $CO_2$ diffuses out from inside the inner tube, as indicated by the horizontal arrows in FIG. 3b, into the diffusion chamber 28' between the inner tube and the inside of the reaction chamber 22'.

Thus, the membrane 25' defines a outer diffusion chamber 28', the outer diffusion chamber 28' having an inlet 1' to admit a sweep gas arranged to sweep $CO_2$ diffused into the diffusion chamber out through the diffusion chamber 28' and out through an outlet 7' from the diffusion chamber 28'. As an example only, the sweep gas may be $N_2$ or $H_2O$. The diameter of the inner tube formed by the membrane 25' influences the production of hydrogen rich synthesis gas. Increasing the membrane diameter or the inner tube diameter will cause an increase in the production of hydrogen rich synthesis gas (syngas).

FIG. 3c is a schematic drawing of an exemplary reaction chamber 22" of a reformer device according to the invention. Again, the reaction chamber 22" of the reformer device 20 of the invention may be one out of a plurality of reaction chambers, e.g. one out of a plurality of steam reformer tubes. As in the embodiments of FIGS. 3a and 3b, the reaction chamber 22" comprises a membrane 25" extending along all of a longitudinal axis (not shown in FIG. 3c) of the reaction chamber 22". The embodiment shown in FIG. 3c is an inner diffusion chamber with a counter-current flow of sweep gas.

As showed in FIG. 3c, the membrane 25" is placed as an inner tube within the reaction chamber so that during operation of the reformer device of the invention, $CO_2$ will diffuse from outside the inner tube into the inner tube as indicated with the horizontal arrows. The membrane 25" thus defines an inner diffusion chamber 28". The reaction chamber 22" surrounding the inner diffusion chamber 28" comprises catalyst material 26" arranged to catalyze both a steam methane reforming reaction and a water gas shift reaction. The catalyst material 26" is thus confined to the space between the membrane 25" and the inner wall of the reaction 22". In a cross-section perpendicular to the longitudinal axis of the reaction chamber 22", this space with catalyst material 26" is an annular space.

The inner diffusion chamber 28" has an inlet 1" to admit a sweep gas arranged to sweep $CO_2$ diffused into the diffusion chamber out through an outlet 7" from the diffusion chamber 28". As an example only, the sweep gas may be $N_2$ or $H_2O$. The reaction chamber 22" moreover comprises an inlet 1 for supply stream of hydrocarbon stream, e.g. natural gas $CH_4$ and $H_2O$, and an outlet 7 for outletting hydrogen rich synthesis gas (syngas).

The difference between the embodiments shown in FIGS. 3b and 3d is that in the embodiment of FIG. 3b, the sweep gas and the reactant gas to flow co-currently, whilst the sweep gas and the reactant gas flow counter-currently in the embodiment shown in FIG. 3c.

FIG. 3d is a schematic drawing of an exemplary reaction chamber 22''' of a reformer device according to the invention. Again, the reaction chamber 22''' of the reformer device 20 of the invention may be one out of a plurality of reaction chambers, e.g. one out of a plurality of steam reformer tubes. The reaction chamber 22''' comprises a membrane 25''' extending along all of a longitudinal axis (not shown in FIG. 3d) of the reaction chamber 22'''. The embodiment shown in FIG. 3d is an outer diffusion chamber with a counter-current flow of sweep gas.

The inner tube of the reaction chamber 22''' as confined by the membrane 25''' comprises catalyst material 26''' arranged to catalyze both a steam methane reforming reaction and a water gas shift reaction. Thus, the inner tube of the reaction chamber 22''' as confined by the membrane 25''' is the reaction zone of the reaction chamber 22''', whilst the space as defined between the membrane 25''' and the inner wall of the reaction chamber 22''' along the longitudinal axis of the reaction chamber 22''' constitutes the diffusion chamber 28'''.

Thus, the membrane 25''' defines a outer diffusion chamber 28''', the outer diffusion chamber 28''' having an inlet 1''' to admit a sweep gas arranged to sweep $CO_2$ diffused into the diffusion chamber through the outer diffusion chamber 28''' and out through an outlet 7''' from the outer diffusion chamber 28'''. As an example only, the sweep gas may be $N_2$ or $H_2O$. The reaction chamber 22''' moreover comprises an inlet 1 for supply stream of hydrocarbon stream, e.g. natural gas $CH_4$ and $H_2O$, and an outlet 7 for outletting hydrogen rich synthesis gas (syngas). In the embodiment of FIG. 3d, $CO_2$ diffuses out from inside the reaction zone or inner tube as defined by the membrane 25''', as indicated by the horizontal arrows in FIG. 3d, into the outer diffusion chamber 28''' defined between the inner tube and the inside of the reaction chamber 22'''.

The difference between the embodiments shown in FIGS. 3b and 3d is that in the embodiment of FIG. 3b, the sweep gas and the reactant gas to flow co-currently, whilst the sweep gas and the reactant gas flow counter-currently in the embodiment shown in FIG. 3d.

FIG. 4 is a graph depicting the reactor temperature within a reaction chamber of the invention as a function of the efficiency of a membrane in the reaction chamber of the invention. The graph of FIG. 4 shows the result of a simulation of how the exit temperature from the reaction chamber can be decreased from 950° C., which is a typical outlet temperature from a conventional reformer, to a temperature of below 700° C. in a reformer of the invention, operating with an efficient membrane which continuously removes $CO_2$ from the product gas and still produces the same amount of hydrogen. The membrane efficiency is indicated in arbitrary units ([a.u.]).

FIG. 5 is a graph depicting an increase in $H_2$ production as a function of the $CO_2$ permeance of the membrane in a reaction chamber of the invention.

FIG. 5 shows that the hydrogen production yield can be increased in a reaction chamber of a reformer device, with a $CO_2$ membrane, compared to a reaction chamber operated at similar conditions, but without the membrane. FIG. 5 also shows calculations of the increase in hydrogen production yield in a case, where the membrane is only provided in the most downstream one third of the reaction chamber. Simulations have revealed that intensive removal of $CO_2$ from the upstream part of the reaction chamber leads to decreasing production of hydrogen rich synthesis gas, especially in the case of a sweep gas in co-current with the reactant gas. This is because $CO_2$ removal in this part shifts the water gas swift reaction toward the "$CO_2+H_2$" side (see reactions (2) and (4)), resulting in removal of water and therefore a decreasing potential for methane conversion in the steam reforming reaction (see reactions (1) and (3)).

FIG. 5 show that a design where the membrane is provided in the most downstream one third of the reaction chamber has the same efficiency as a similar reaction chamber with a membrane throughout the whole length of the reaction chamber for permeance values above 7.5 $kmol/m^2/h/atm$. This is noteworthy in relation to cost considerations in that expenses for a $CO_2$ membrane can be high.

Finally, calculations have shown that increasing the sweep gas flow when using membrane material having a high permeance increases the hydrogen production further.

The invention claimed is:

1. A reformer device comprising a reaction chamber for carrying out a reaction having a hydrocarbon stream as a reactant gas and with hydrogen rich synthesis gas as a reaction product, wherein a membrane is provided within the reaction chamber, said reformer device further comprising a heating reactor for heating the reaction chamber, wherein
 a. the membrane is a semi-permeable membrane arranged to allow $CO_2$ pass through it,
 b. the reaction chamber comprises a catalyst material arranged to catalyze a steam methane reforming reaction and to catalyze a water gas shift reaction, and
 c. the reformer device is arranged to carry out the steam methane reforming reaction at a pressure between about 25 and about 50 barg within the reaction chamber.

2. A reformer device according to claim 1, wherein the membrane defines an inner diffusion chamber, the inner diffusion chamber having an inlet to admit a sweep gas arranged to sweep $CO_2$ diffused into the diffusion chamber out through an outlet from the diffusion chamber.

3. A reformer device according to claim 1, wherein the membrane defines an inner reaction chamber and an outer diffusion chamber, the outer diffusion chamber having an inlet to admit a sweep gas arranged to sweep $CO_2$ diffused into the diffusion chamber out through an outlet from the diffusion chamber.

4. A reformer device according to claim 2, arranged to allow the sweep gas and the reactant gas to flow in countercurrent.

5. A reformer device according to claim 1, wherein the permeance of the $CO_2$ membrane is above about 1 kmol/$m^2$/h/atm.

6. A reformer device according to claim 1, wherein the membrane is only provided in a most downstream half of the reaction chamber.

7. A reformer device according to claim 1, wherein the temperature within the reformer device during steam reforming is below about 800° C.

8. A reformer device according to claim 1, wherein the reformer device is a fired reformer, a radiant wall reformer, a convective reformer, or an autothermal reformer.

9. A reformer device according to claim 1, wherein the membrane is only provided in a most downstream third of the reaction chamber.

10. A reformer device according to claim 1, wherein the membrane is only provided in a most downstream fourth of the reaction chamber.

11. A reformer device according to claim 1, wherein the temperature within the reformer device during steam reforming is below about 700° C.

12. A reformer device according to claim 1, wherein the reformer device is arranged to carry out the steam methane reforming reaction at a pressure between about 30 and about 50 barg within the reaction chamber.

* * * * *